Oct. 23, 1934. F. W. CALDWELL ET AL 1,978,039
SPINNER STRUCTURE FOR AIRCRAFT
Filed Aug. 4, 1933
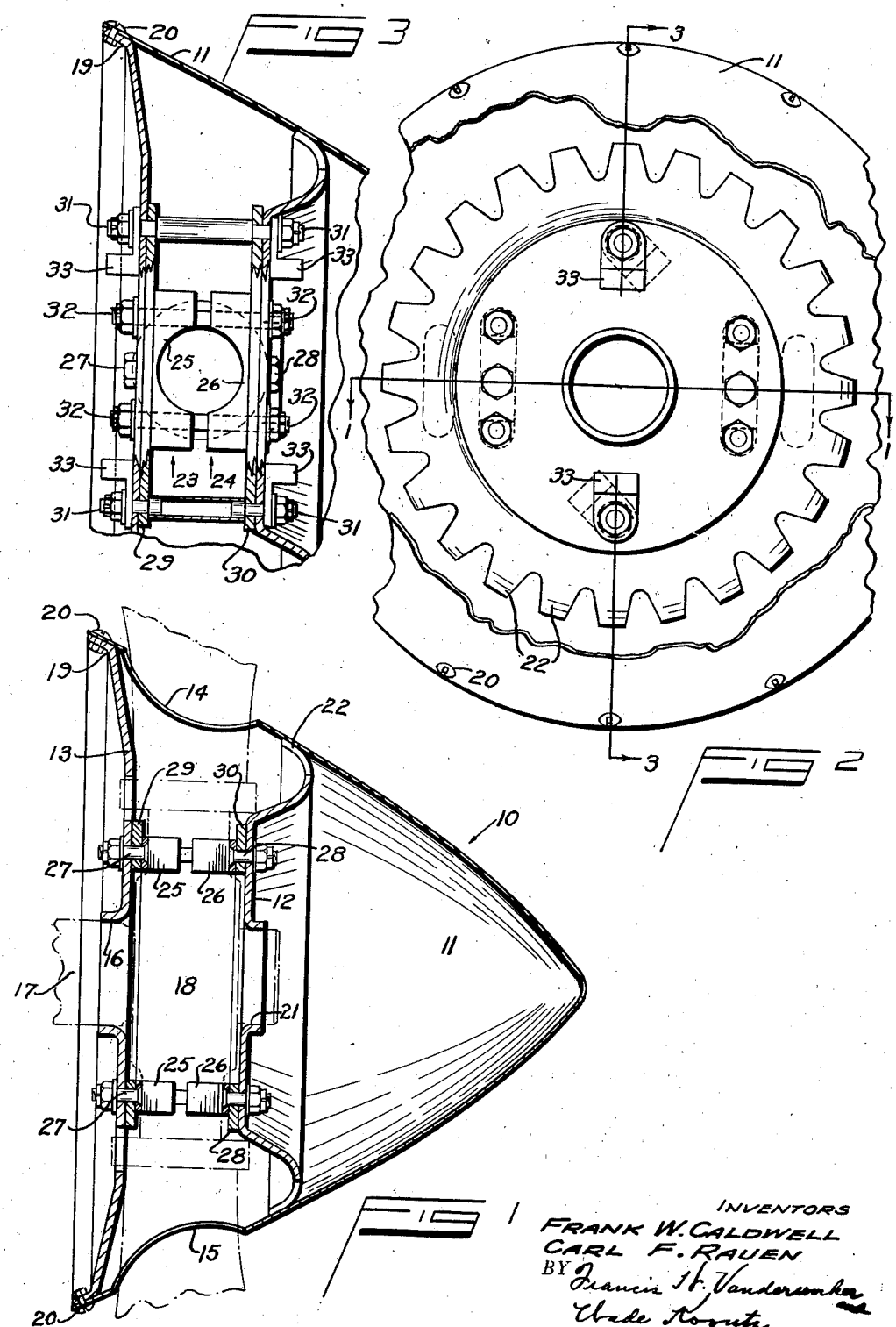
INVENTORS
FRANK W. CALDWELL
CARL F. RAUEN
BY
ATTORNEYS Patented Oct. 23, 1934

1,978,039

UNITED STATES PATENT OFFICE 1,978,039

SPINNER STRUCTURE FOR AIRCRAFT

Frank W. Caldwell, Hartford, Conn., and Carl F. Rauen, Detroit, Mich.

Application August 4, 1933, Serial No. 683,708

8 Claims. (Cl. 170—177)

The present invention relates generally to aircraft and more particularly to spinners such as are carried in the forward end of the motor in aircraft and serve as a protection or covering for the hub of the propeller.

The primary object of the present invention is to provide a spinner which is simple in construction and which is easily assembled on the propeller hub and capable of accurate positioning thereon.

A further object of the present invention is to provide a spinner of this character with means for readily clamping the same upon the shank end of the hub in a manner such that its removal from the hub may be accomplished with a maximum saving in time and which is further characterized by being of few parts and light weight.

A still further object of the present invention is to provide in a spinner of this character means whereby the propeller hub with spinner attached may be balanced in vertical and in horizontal plane without requiring the removal of the spinner therefrom.

These and other objects of the invention will be made to appear in the course of the following description in which reference is made to the accompanying drawing, wherein:

Fig. 1 is a central longitudinal section of a propeller spinner structure applied to a propeller hub in accordance with my invention, taken on the line 1—1 of Fig. 2.

Fig. 2 is a front elevation with the air piercing cone partially broken away.

Fig. 3 is a sectional view taken on the line 3—3 of Fig. 2.

Referring more particularly to the drawing wherein corresponding parts are designated by like numerals throughout the several views thereof, the numeral 10 indicates the spinner which comprises generally the air piercing cone 11, the forward disc 12 and the rear disc 13. As shown in the drawing, the air piercing cone 11 is provided with elongated openings 14 and 15 at its rear end through which the propeller blade shanks pass.

The rear disc 13 is formed with a central annular flange portion indicated by the numeral 16 which fits snugly upon the central engine shaft receiving portion 17 of the hub 18 of the propeller. The peripheral or circumferential edge of the rear disc 13 is also formed with a rearwardly extending tapering flange portion 19 adapted for having a wedging fit with the rear end of the air piercing cone 11. Bolts 20 are provided for securing the flange portion of the disc 13 and the cone 11 together.

The front disc 12 is formed with a central annular flange portion 21 which fits snugly upon the central engine shaft receiving portion 17 of the hub 18 of the propeller. As shown in Figs. 1 and 2, the peripheral edge of the forward disc is formed with scallops or spring-like fingers 22 which yieldingly engage the air piercing cone to centralize it with respect to the hub of the propeller.

The spinner is driven by a pair of clamping members 23 and 24 equidistantly placed from the center of rotation of the propeller hub and each member comprises a pair of clamping blocks 25 and 26 carried in opposing relation on the front and rear supporting discs respectively and rigidly secured thereto by bolts 27 and 28. These blocks are centered by means of a pair of spaced rings 29 and 30 secured to the front and rear discs by means of the bolts 31.

The clamping blocks are held in firm and rigid relationship on the shank end of the propeller hub by means of the clamping bolts 32. As shown in the drawing, the bolts 31, heretofore mentioned, have mounted thereon balancing lugs 33 which may be provided in sets or interchanged as desired to properly balance the propeller hub and spinner in vertical and in horizontal planes by shifting the same in the manner indicated in the dotted line position, as illustrated in Fig. 2.

From the foregoing description it will be apparent that we have provided a very simple, light and economical spinner construction wherein the parts are rigidly supported in proper position, streamlining the propeller hub, eliminating the necessity of other parts being added or removed after the parts have been assembled as is necessary in structures now in common use.

What we claim is:

1. A spinner for propeller hubs comprising, an air piercing cone in front of said propeller having openings therein for receiving the shank of the propeller blades, means for supporting said cone comprising a pair of spaced discs, one positioned forwardly of and adjacent to said propeller, the other rearwardly of and adjacent to the same, and clamping means including clamping members interposed between said discs for holding said discs in clamping engagement on said propeller hub.

2. A spinner for propeller hubs comprising, an air piercing cone in front of said propeller having openings therein for receiving the shank of the propeller blades, front and rear supporting discs for said cone clamped to the hub of said propeller, the rear supporting disc being provided with a tapered forwardly extending circumferential flange portion, the rear end of said cone having a wedging fit on the flange portion of said rear disc, and bolts for securing said flange portion and the rear end of said cone in wedging relationship.

3. A spinner for propeller hubs comprising, an air piercing cone in front of said propeller having openings therein for receiving the shank of the propeller blades, means for supporting said cone comprising a pair of spaced discs, one positioned forwardly of and adjacent to the propeller, the other rearwardly of and adjacent to the same, each including a central annular flange portion bearing on said hub to center said disc relative to said hub, and clamping means including clamping members interposed between said discs for holding said discs in clamping engagement on said propeller hub, the front supporting disc being provided with circumferentially disposed spring-like projections wedgingly engaging said cone surface forward of said propeller, the rear supporting disc being provided with a tapered rearwardly extending flange portion and having a wedging fit with the rear end of said air piercing cone.

4. A spinner for propeller hubs comprising, an air piercing cone in front of said propeller, having openings therein for receiving the shank of the propeller blades, means for supporting said cone comprising a pair of spaced discs, one positioned forwardly of and adjacent to said propeller, the other rearwardly of and adjacent to the same, each disc including a central annular flange portion bearing on said hub to center said disc thereon, clamping members carried by said disc for holding said disc in clamping engagement on said propeller hub, the front supporting disc being provided with a plurality of radially arranged spring-like projections disposed about the circumferential edge thereof wedgingly engaging the inner surface of said air piercing cone forwardly of said propeller, the rear supporting disc being provided with a rearwardly extending tapered flange portion having a wedging fit with the inner rear end of said air piercing cone and bolts extending through the adjacent edges of said clamping members for drawing the same into clamping position.

5. A spinner for propeller hubs comprising an air piercing cone in front of said propeller having openings therein for receiving the shank of the propeller blades, means for supporting said cone comprising a pair of spaced discs, one positioned immediately in front of said propeller, the other immediately behind the same, each including a central annular flange portion bearing on said hub to center said disc thereon, means for holding said disc in clamping engagement on said propeller hub comprising a pair of diametrically opposite clamping blocks, the halves of which are fixedly secured to the front and rear supporting discs respectively and bolts extending through the adjacent edges of said clamping blocks for drawing the same into clamping position.

6. A spinner for propeller hubs comprising, an air piercing cone in front of the propeller having openings for receiving the shank of the propeller blades, means for supporting said cone comprising a pair of spaced discs, one positioned immediately in front of said propeller, the other immediately behind the same, each including a central annular flange portion bearing on said hub to center said discs thereon, clamping means including clamping members interposed between said discs for holding said discs in clamping engagement on said propeller hub and means carried by said clamping means for balancing in a vertical and horizontal plane said propeller, hub and spinner.

7. A spinner for propeller hubs comprising an air piercing cone in front of said propeller having openings therein for receiving the shank of the propeller blades, means for supporting said cone comprising a pair of spaced discs, one positioned immediately in front of said propeller, the other immediately behind the same, each including a central annular flange portion bearing on said hub to center said discs thereon, clamping means including clamping members interposed between said discs for holding said discs in clamping engagement on said propeller hub and adjustable balancing members carried by said clamping means for balancing in a vertical and horizontal plane said propeller, hub and spinner.

8. A spinner for propeller hubs comprising, an air piercing cone in front of said propeller, having openings for receiving the shank of the propeller blades, means for supporting said cone comprising a pair of spaced discs, one being positioned immediately in front of said propeller, the other immediately behind the same, each including a central annular flange portion bearing on said hub to center said discs thereon, clamping means including clamping members interposed between said discs for holding the same in clamping engagement on said propeller hub and interchangeable balancing members adjustably mounted on said front and rear discs for balancing in a vertical and horizontal plane said propeller, hub and spinner.

FRANK W. CALDWELL.
CARL F. RAUEN.